(12) United States Patent
Galkiewicz et al.

(10) Patent No.: US 7,140,774 B2
(45) Date of Patent: Nov. 28, 2006

(54) SLIDABLE FASTENER BEARING ASSEMBLY

(75) Inventors: Robert K. Galkiewicz, Roseville, MN (US); Stefan Dietrich, Ratingen (DE)

(73) Assignee: 3M Innovative Properties Company, St. Paul, MN (US)

( * ) Notice: Subject to any disclaimer, the term of this patent is extended or adjusted under 35 U.S.C. 154(b) by 179 days.

(21) Appl. No.: 10/788,597

(22) Filed: Feb. 27, 2004

(65) Prior Publication Data

US 2004/0170341 A1    Sep. 2, 2004

Related U.S. Application Data

(63) Continuation-in-part of application No. 10/376,787, filed on Feb. 28, 2003, now abandoned.

(51) Int. Cl.
*F16C 29/02*  (2006.01)

(52) U.S. Cl. ............................................. 384/9; 384/42

(58) Field of Classification Search ............... 384/7, 384/9, 26, 42
See application file for complete search history.

(56) References Cited

U.S. PATENT DOCUMENTS

| | | | |
|---|---|---|---|
| 3,266,113 A | 8/1966 | Flanagan, Jr. | |
| 4,290,174 A | 9/1981 | Kalleberg | |
| 4,894,060 A | 1/1990 | Nestegard | |
| 5,044,778 A | 9/1991 | Hines | |
| 5,077,870 A | 1/1992 | Melbye et al. | |
| 5,119,531 A | 6/1992 | Berger et al. | |
| 5,176,454 A | 1/1993 | Schlereth | |
| 5,235,731 A | 8/1993 | Anzai et al. | |
| 5,345,659 A | 9/1994 | Allan | 24/442 |
| 5,868,987 A | 2/1999 | Kampfer et al. | |
| 5,888,621 A | 3/1999 | Fröhlich et al. | 428/182 |
| 6,106,922 A | 8/2000 | Cejka et al. | |
| 6,132,660 A | 10/2000 | Kampfer | |
| 6,155,716 A | 12/2000 | Okamura et al. | |
| 6,248,276 B1 | 6/2001 | Parellada et al. | |
| 6,367,128 B1 | 4/2002 | Galkiewicz et al. | |
| 6,470,540 B1 | 10/2002 | Aamodt et al. | |
| 2003/0106188 A1 | 6/2003 | Armela | |

FOREIGN PATENT DOCUMENTS

| | | |
|---|---|---|
| DE | 31 13 020 A1 | 11/1982 |
| JP | 1995164252 A | 6/1995 |
| WO | WO 95/23739 A1 | 9/1995 |
| WO | WO 03/059110 A2 | 7/2003 |

*Primary Examiner*—Thomas R. Hannon
(74) *Attorney, Agent, or Firm*—Nancy M. Lambert

(57) ABSTRACT

A bearing assembly is disclosed, which comprises at least two slidable fasteners interengaged with at least two bearing pieces such that the slidable fasteners have substantially unrestricted biaxial motion relative to one another. The bearing pieces are comprised of self-closable fastener film comprising a base sheet and a multiplicity of ribs projecting from the base sheet, wherein the flat side of the first bearing piece is attached to the flat side of the second bearing piece such that the ribs of the first bearing piece are not parallel relative to the ribs of the second bearing piece.

47 Claims, 5 Drawing Sheets

SLIDABLE FASTENER BEARING ASSEMBLY

CROSS REFERENCE TO RELATED APPLICATIONS

This application is a continuation-in-part of U.S. patent application Ser. No. 10/376,787, filed Feb. 28, 2003 now abandoned.

FIELD

This invention relates to bearing assemblies using mating reclosable mechanical fasteners, which provide biaxial motion to two or more substrates relative to one another.

BACKGROUND

In current applications, motion of an assembly or substrate along one axis is typically provided by ball bearing slides, or by creating a hole in the assembly and sliding it along a suspended rod or wire. This simple type of motion can be created also by sliding two engaged lengths of reclosable fastener film relative to one another along the rib direction, such as the self-mating fasteners as described in U.S. Pat. No. 6,367,128.

Self-mating fasteners, such as those described in U.S. Pat. No. 6,367,128, comprise a base sheet and a multiplicity of parallel, narrowly spaced, elastically deformable ribs with at least one flange projecting from a major surface of the base sheet. The width and spacing of ribs are chosen so that when the ribbed surface of the fastener is pressed against an identical ribbed surface, the ribs of one surface will be accommodated between the ribs of the other surface, and ribs on the two surfaces can deform and their flanges move past one another to interengage and hold the surfaces together.

Fasteners as described have a number of important advantages. These include convenient engagement at a desired level of pressure or force; resistance to disengagement, especially resistance to peel forces, which combines with low engagement force to provide a wide range of utilities; an advantageous self alignment when fasteners are brought into engagement with one another; high durability adapting the fasteners to repeated use; low manufacturing cost; and low inventory cost, given the need to stock only one product in the case of a self-mating fastener.

In view of the foregoing, one drawback of sliders based on reclosable mating fasteners is that motion is restricted to one direction. What is desired is means to introduce biaxial motion between two substrates using reclosable mating fasteners.

SUMMARY

The present invention provides a means to introduce biaxial motion between two substrates using reclosable mating fasteners. A bearing assembly is provided that allows motion along two planes relative to one another when two or more mating reclosable fasteners are interengaged.

In one aspect of the invention, a bearing assembly is provided that comprises a reclosable fastener film comprising a base sheet and a multiplicity of parallel ribs projecting from the base sheet to form a first slidable fastener; a reclosable fastener film comprising a base sheet and a multiplicity of parallel ribs projecting from the base sheet to form a first bearing piece; a reclosable fastener film comprising a base sheet and a multiplicity of parallel ribs projecting from the base sheet to form a second bearing piece; and a reclosable fastener film comprising a base sheet and a multiplicity of parallel ribs projecting from the base sheet to form a second slidable fastener, and a bearing formed when the flat side of the base sheet opposite the ribbed surface of the first bearing piece is attached to the flat side of the base sheet opposite the ribbed surface of the second bearing piece such that the ribs of the second bearing piece are not parallel to the ribs of the first bearing piece.

The ribs of the first bearing piece are interengaged with the ribs of the first slidable fastener and the ribs of the second bearing piece are interengaged to the ribs of second slidable fastener such that the second slidable fastener is not parallel to the first slidable fastener. After interengagement with the bearing, the first and second slidable fasteners of the bearing assembly have substantially unrestricted biaxial motion relative to one another while maintaining substantially restricted motion in the axial direction perpendicular to the plane of motion of the slidable fasteners.

Also provided is a bearing assembly as described below attached to at least one substrate to provide substantially unrestricted biaxial motion to another substrate while maintaining substantially restricted motion in the axial direction perpendicular to the plane of motion of the substrate.

Also provided is a bearing assembly further comprising a rotational element in the bearing that provides rotational motion around a hypothetical z-axis perpendicular to the X-Y plane defined by the bearing while effectively preventing perpendicular motion of the substrate along the z-axis.

Also provided is a bearing assembly that has convenient low engagement at a desired level of pressure or force; resistance to disengagement, especially resistance to peel forces, which combines with low engagement force to provide a wide range of utilities; high durability adapting the assembly to repeated use; low manufacturing cost; low inventory cost; and easy customization by an end-user.

BRIEF DESCRIPTION OF THE DRAWINGS

The present invention will be further described with reference to the accompanying drawings, in which.

DETAILED DESCRIPTION

The present invention provides a bearing assembly using mating reclosable mechanical fasteners between two substrates or surfaces. As used herein the term "mating reclosable mechanical fastener" refers to fasteners comprising a base sheet with a multiplicity of parallel, elastically deformable ribs with at least one flange projecting from a major surface of the base sheet. As used herein, the term "rib"

includes both continuous and discontinuous projections from a base sheet, such as the continuous rail structure disclosed in U.S. Pat. No. 6,367,128, and the discontinuous series of closely spaced projections of varying shapes disclosed in U.S. Pat. Nos. 5,077,870 and 4,290,174. The width and spacing of ribs are chosen so that when the ribbed surface of the fastener is pressed against a mating ribbed surface, the ribs of one surface will be accommodated between the ribs of the other surface, and ribs on the two surfaces can deform and their flanges move past one another to interengage and hold the surfaces together. Self-mating reclosable mechanical fasteners are mating fasteners in which the ribbed surfaces are identical. This bearing assembly allows continuous translational movement of one substrate along two axes in a plane, i.e., the X-Y plane, relative to the other substrate, while effectively preventing motion in a third planar direction, i.e., the Z axis. For ease of reference, the present invention can be described in reference to the X-Y-Z axes to describe motion in the relative planes. However, it should be understood that the present invention would include a bearing assembly with translational motion in the X-Z or Y-Z plane without limitation.

For nominal loads, typically less than ten pounds, and where extreme precision is not required, with a number of repeat cycle movements that is in the hundreds or thousands, the fastener films can be interconnected to form bearing assemblies of the present invention which provide two-dimensional guided motion for minimal cost. The present invention can also provide easy customization by an end user. For example, fastener films laminated with a pressure sensitive adhesive and a liner on the flat side of the fastener film base sheet can be made available to end-users to create customized bearing assemblies with no need of special tools or equipment.

Figure 1:
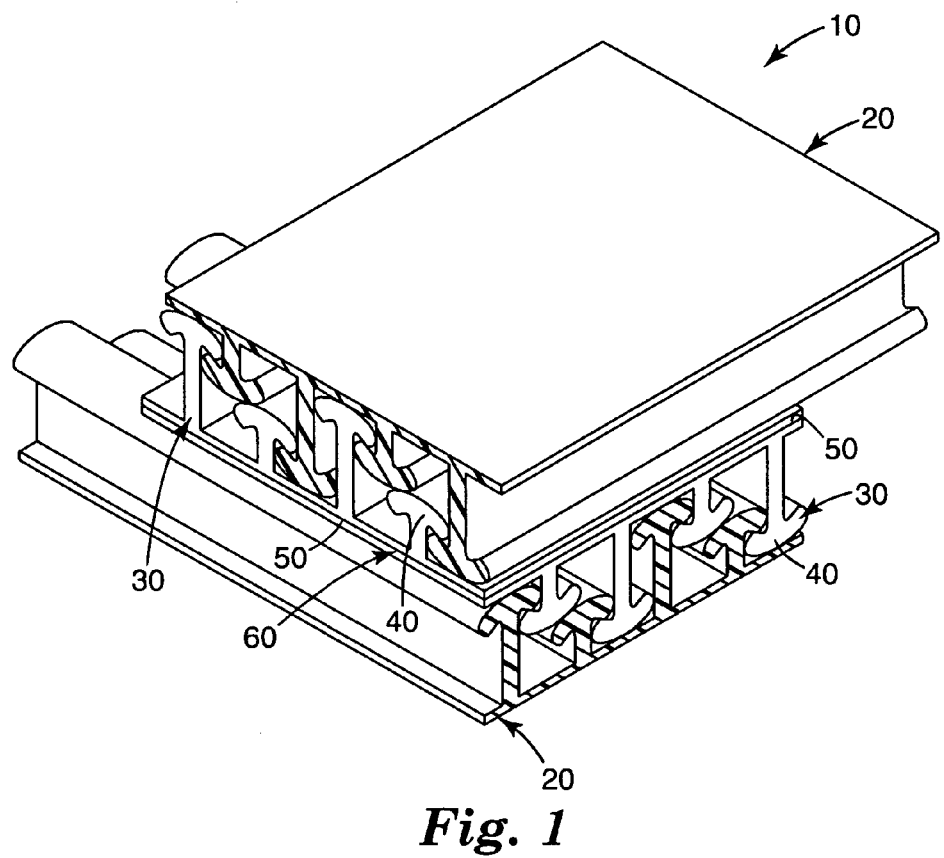
FIG. 1 is a perspective and cross-sectional view of one embodiment of the bearing assembly of the invention.

As shown in FIG. 1, an embodiment of the present invention demonstrates a bearing assembly 10 that permits continuous translational movement of two planar slidable fasteners 20 parallel to their surfaces in the X-Y plane, while restricting movement perpendicular to their surface or in rotation. This biaxial motion is created by constructing a bearing 60 that is capable of interengaging with the slidable fasteners 20. The two slidable fasteners 20 are fastener film of varying lengths and width with a ribbed surface on one side. The bearing pieces 30 are also constructed with fastener film having a ribbed surface 40 and a flat surface 50 opposite the ribbed surface 40. Bearing pieces 30 can be any length and width but are typically smaller in dimension than slidable fasteners 20. The bearing 60 is created by attaching the flat surface 50 of one bearing piece to the flat surface 50 of another bearing piece such that the ribbed surfaces 40 are not parallel. Alternatively, the bearing 60 may be formed as a single piece, for example, by injection molding.

Figure 2:
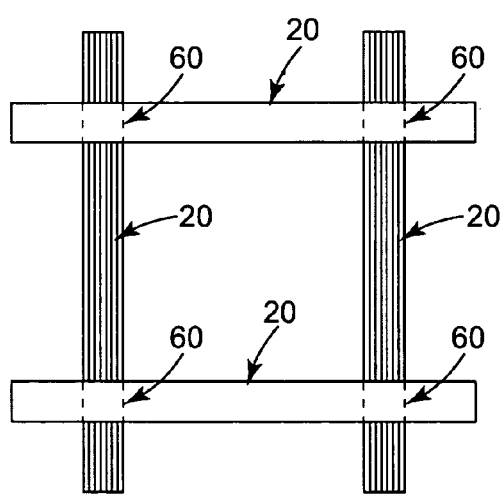
FIG. 2 is a top plan view of multiple slidable fasteners interengaged with multiple bearing pieces of the present invention.

In FIG. 1, the bearing pieces 30 are attached such that the ribbed surfaces 40 on each bearing piece 30 are perpendicular to each other. However, in alternate embodiments the ribbed surfaces on each bearing piece can range between 0 and 180 degrees from parallel to each other. The bearing pieces 30 can be laminated to one another using an adhesive, or other means of attaching flat surfaces. The opposing ribbed surfaces 40 of the bearing 60 are interengaged with the two slidable fasteners 20 to create the bearing assembly 10. In FIG. 2, an embodiment of the present invention in provided using multiple bearings 60 (shown by dashed lines) interengaged with multiple slidable fasteners 20.

Figure 3:
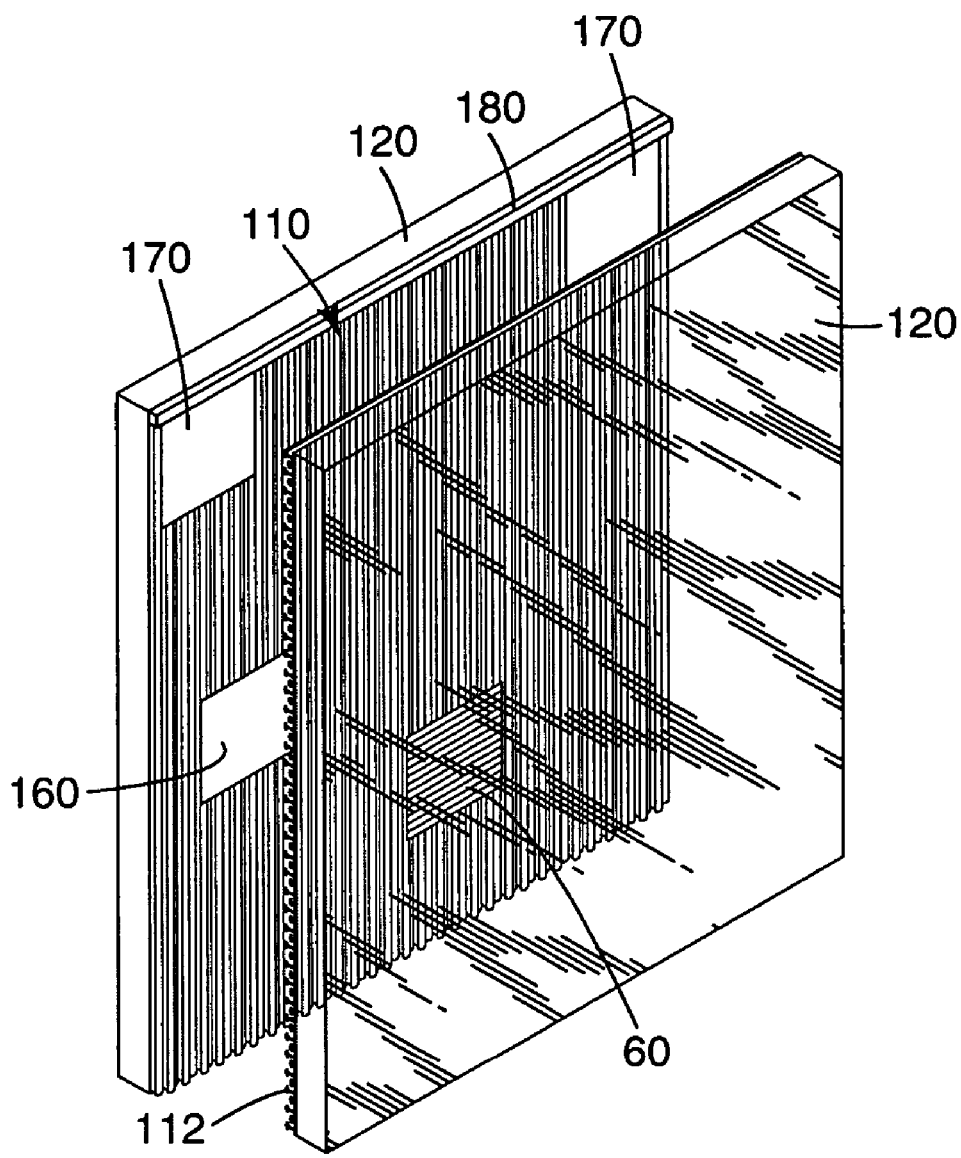
FIG. 3 is a perspective view of a bearing assembly with tabs in one embodiment of the present invention.

In an alternate embodiment shown in FIG. 3, the flat surface of slidable fasteners 110 and 112 are laminated to rigid substrates 120 which may be the same or different. A bearing 60, similar to the one shown in FIG. 1, is located between the rigid substrates 120. The ribbed surfaces of bearing 60 are interengaged on opposite sides with the ribbed surfaces of slidable fasteners 110 and 112. The bearing 60 interengaged with the slidable fasteners 110 and 112 allow biaxial motion of the rigid substrates 120 in the X-Y plane with movement substantially restricted perpendicular to the plane of the rigid substrates 120. More than one bearing 60 can be included to facilitate movement of rigid substrates 120 relative to one another. In alternate embodiments not shown, one or more of the substrates may be flexible and/or curved.

If it is desired to limit the motion of the substrates as shown in FIG. 3, then a cross direction tab 160 of fastener film can be placed strategically on slidable fastener 110. The tab 160 is constructed of sufficient thickness to prevent further movement of the substrate. The tab 160 located on slidable fastener 110 stops motion of the opposite rigid substrate 120 when the second slidable fastener 112 contacts the tab 160.

Optionally, to limit translational motion of the slidable fastener 112 machine direction tabs 170 are provided. As shown, machine direction tabs 170 comprise two roughly similar pieces of fastener film. Machine direction tabs 170 form spacers that stop slidable fastener 112. The tabs 170 contact raised edge 180 on slidable fastener 110 to prevent tabs 170 from moving beyond edge 180. Alternatively, multiple cross direction tabs 160 and machine direction tabs 170 can be used on slidable fasteners 110 and 112 either together or alone.

Other means exist to provide stops of relative motion of the substrates. For instance, holes may be placed through substrates laminated with fastener film and a pin positioned through a hole in the upper substrate which is aligned with a hole in the lower substrate. As another example, the ribs can be offset at certain points to limit or prevent movement, for example, as disclosed in U.S. Pat. No. 5,119,531. In addition, deformations of the rib structure are also useful to limit relative movement of the fasteners in the bearing assembly. One such deformation structure, or dam, can be conveniently formed by contact of the ribbed surface of an extruded web with projections on a heated wheel, whereby longitudinally spaced portions of the ribbed structure are periodically pressed down and accumulate as a raised structure or dam.

In certain embodiments, a less severe deformation in the ribbed structure (for example, a notch, slit, bulge, edge, or curve) can provide a temporary cessation of axial movement. The deformation can be overcome, and axial motion resumed, with additional application of force without disengaging the fastener elements. Examples of such deformations include those described in U.S. Pat. No. 5,119,531.

In some embodiments, these deformations may also affect engagement and/or disengagement, for example by controlling or limiting engagement and/or disengagement between deformations. The deformation can be overcome, and engagement or disengagement resumed, with additional application of force without disengaging the fastener elements.

Figure 4:
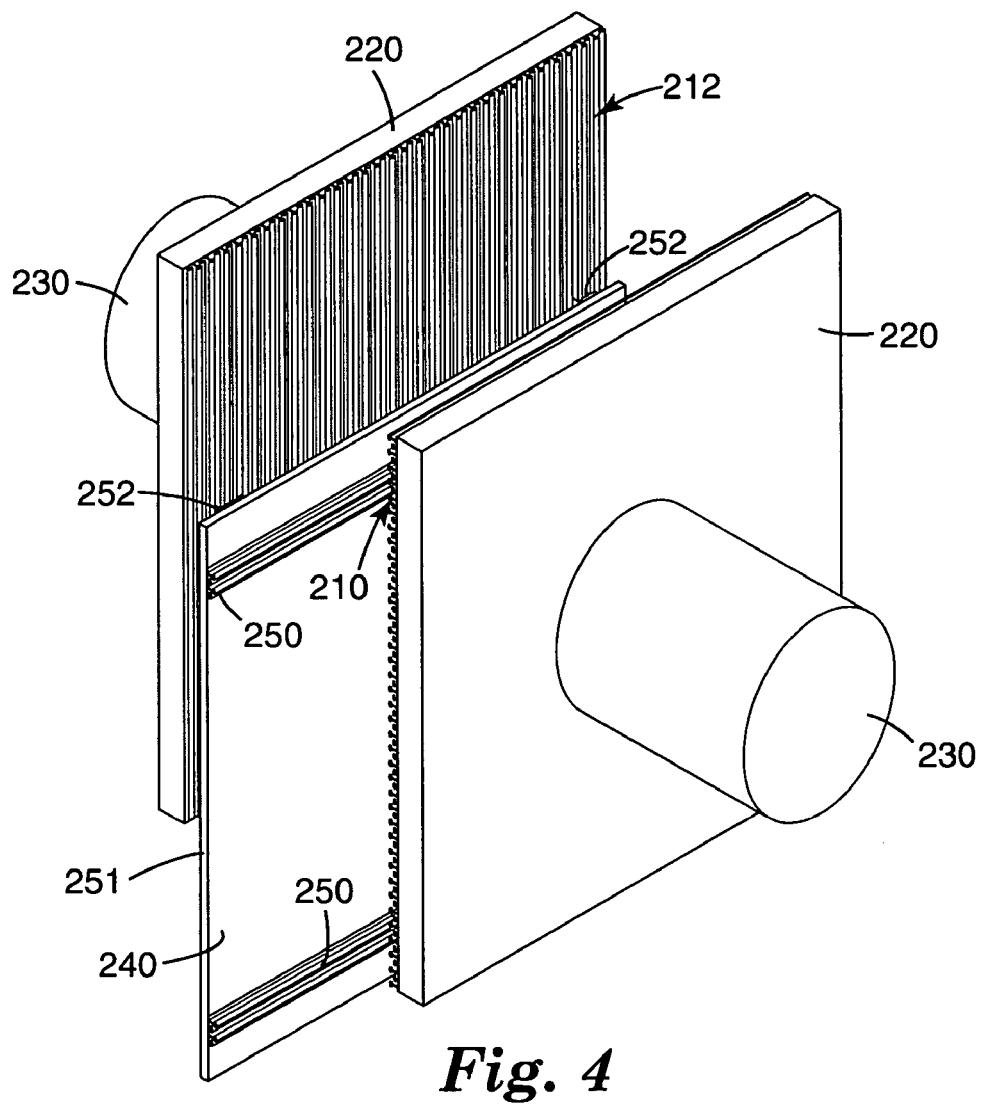
FIG. 4 is a perspective view of a bearing assembly in another embodiment of the present invention.

In an alternate embodiment shown in FIG. 4, the flat surfaces of slidable fasteners 210 and 212 are laminated to rigid substrates 220. On the side of rigid substrates 220 opposite the slidable fastener, knobs 230 are attached to allow manipulation of the rigid substrates 220. A bearing 240 is constructed by laminating the flat surface of bearing pieces 250 to one side of a rigid plate 251, and laminating the flat surface of bearing pieces 252 to the opposite side of rigid plate 251 such that the ribbed surface on bearing pieces 250 is perpendicular to the ribbed surface on bearing piece 252. In alternate embodiments not shown, the ribbed surfaces of 250 and 252 (and also 210 and 212) can range between 0 and 180 degrees from parallel to each other.

The ribbed surfaces of 250 and 252 of bearing 240 are interengaged on opposite sides with the ribbed surfaces of slidable fasteners 210 and 212. When the two knobs 230 are grasped and manipulated to move the rigid substrates 220 relative to one another, the bearing 240 interengaged with the slidable fasteners 210 and 212 allow biaxial motion of the rigid substrates in the X-Y planes with movement substantially restricted perpendicular to the plane of the rigid substrates 220.

Figure 5:
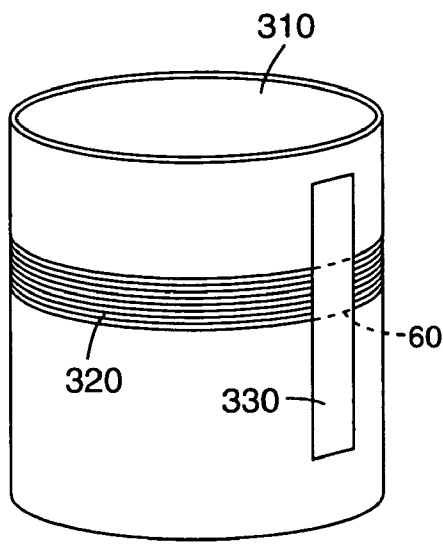
FIG. 5 is a perspective view of a bearing assembly on a substrate in one embodiment of the present invention.

In FIG. 5, a bearing assembly as shown and described in FIG. 1 is constructed with the flat side of one slidable fastener 320 attached to a cylinder 310. The bearing 60 (shown with dashed lines) slides along the slidable fastener 320 and slidable fastener 330 assumes continuously variable biaxial motion along the outer surface of the cylinder while substantially restricting motion radially.

Figure 6:
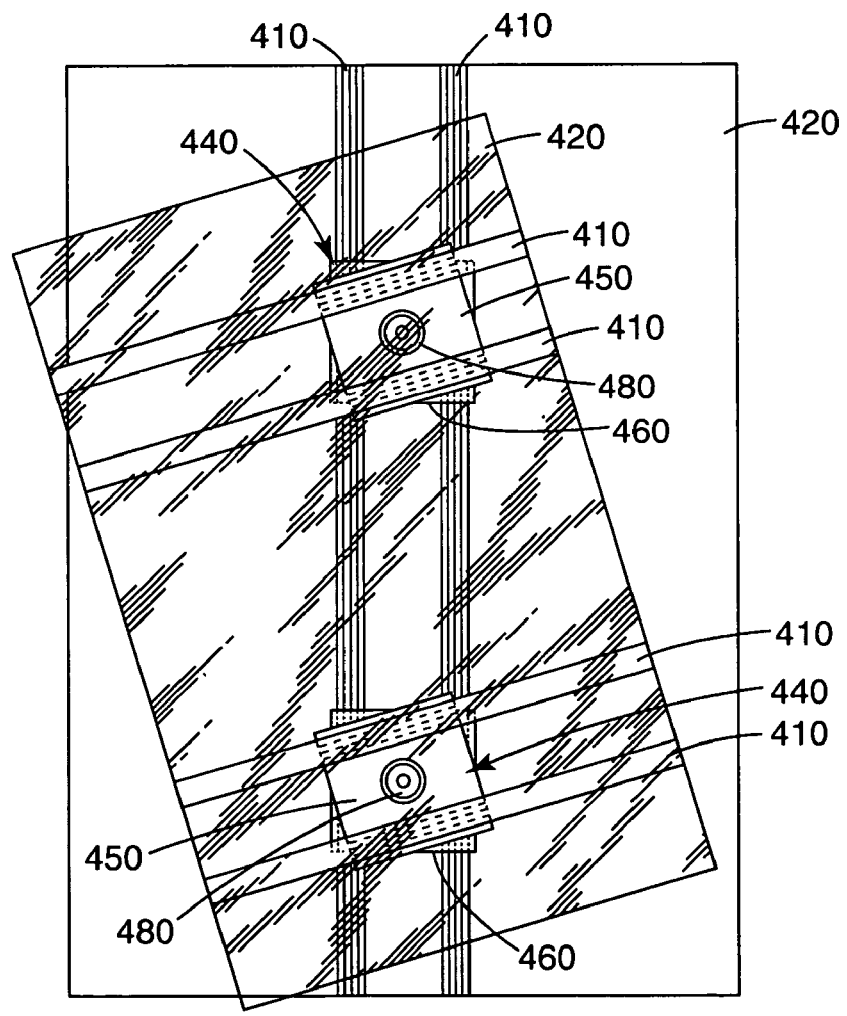
FIG. 6 is a perspective view of the bearing assembly with rotational elements in another embodiment of the present invention.

In an alternative embodiment as shown in FIG. 6, the present invention includes a rotational element to provide substrates 420 with both biaxial motion in the X-Y plane and rotational motion around a hypothetical z-axis that extends through the bearing while effectively preventing perpendicular motion of the substrate along the z-axis. The flat surface of each slidable fastener 410 is laminated to rigid substrate 420. A bearing 440 comprising the flat surface of one bearing piece 450 laminated to the flat surface of a second bearing piece 460, such that the ribbed surfaces are not parallel, is located between the rigid substrates 420. The bearing 440 further comprises a rotational element 480 that extends through the base sheet of both bearing pieces 450, 460. In FIG. 6, the rotational element is a two-part metal snap, with one part attached to 450 and the second part attached to 460. Other rotational elements are possible such as a bolt or screw assembly, rivets, an axle and bushing assembly and the like.

The ribbed surfaces of bearing 440 surrounding the rotational element 480 are interengaged on opposite sides with the ribbed surfaces of each slidable fastener 410. The bearing 440 interengaged with the slidable fasteners 410 allow biaxial motion of the rigid substrates in the X-Y plane with movement substantially restricted perpendicular to the plane of the rigid substrates 420. In addition, the rotational element 480 in bearing 440 allows rotational movement of rigid substrates 420 around a hypothetical z-axis that extends through bearing 440. More than one bearing 440 with rotational element 480 can also be included to facilitate movement of rigid substrates 420 relative to one another.

In some embodiments of the invention, the surface of the base sheet opposite from the ribbed surface on the fastener film carries structure that specially adapts the fastener to attachment to another substrate. Such structure may include ribbed surfaces of the invention in which the rib profile is the same or different from that on the first surface, as well as other mechanical fastening structure such as hooks or loops or headed elements as described, for example, in U.S. Pat. No. 4,290,174, or various adhesive layers. Slidable fasteners of the invention may also be attached onto a substrate by means separate from the fastener, e.g., by a separately applied adhesive, by sewing, welding of base sheet material to the substrate, and other means.

Alternatively, the bearing assembly of the present invention can be incorporated into a larger article having other functions besides fastening, e.g., a frame that could be mounted on a wall to support a picture or other display. The bearing assembly can be incorporated into the larger article in various ways, e.g., by inserting an already prepared bearing assembly into a mold and molding the rest of the article around at least one slidable fastener; or by configuring a mold surface with mold structure shaped to form a slidable fastener of the invention. When the bearing assembly of the invention is incorporated into a larger article, the term "base sheet" herein includes the structure of the article into which the slidable fastener is incorporated.

The bearing assembly of the invention has a number of important advantages, which adapt the bearing assemblies to a number of important uses. For example, for use in environments where rust or corrosion is possible (such as marine environments); for use as a temporary fastener to allow repositioning prior to permanent fastening; or in cases where many cycles of assembly and disassembly are anticipated (such as in toys or games) to preclude the loss of small parts and pieces. The slidable fastener of the invention can be used wherever mechanical fasteners are currently used such as for automotive, electronic, marine, transportation, point of purchase, and automotive aftermarket uses. For example, the slidable fastener of the invention is useful for attachments such as an abrasive disk to a backup pad, access panels, automotive trim, seat covers, headliners, computer monitor covers, carpet, wall decorations, pictures, signage, and displays; closures such as envelopes, mailers, boxes, and pouches; and assemblies such as cell phones, computer printers, office furniture, office panels, toys, and picture frames.

It should be clear that by arranging two such assemblies at right angles, an apparatus can be constructed that would allow translational motion along all three axes. With less complexity and expense, three-dimensional motion can also be provided by combining the invention described above with a one-dimensional or similar slidable fastener in the Z plane.

The bearing assembly of the present invention is not limited to a particular fastener shape, but can be realized with any fastener composed of ridges (ribs, rails, etc.) that extend in one direction with the same cross-sectional shape or alternatively ridges that are relatively long and straight. Any fastener shape that, when distributed on a base sheet, allows lateral slippage along the structural fastener elements, can be used in alternative embodiments of the present invention. See, for example, the fasteners described in U.S. Pat. Nos. 3,266,113; 4,290,174; 4,894,060; 5,119,531; 5,077,870; and 6,470,540.

Although slidable fasteners of the invention generally are used in mating pairs and self-mating pairs are preferred for ease of use, they need not be self-mating pairs, i.e. they also can be interengaged with a fastener of a different shape. For example, a fastener having tall and short ribs may be interengaged with a fastener in which the ribs are all the same height. A wide variety of alternative fasteners have been disclosed from which headed, interengaging elements protrude. See, for example, the fasteners described in U.S. Pat. Nos. 3,266,113; 4,290,174; 4,894,060; 5,119,531; 5,077,870; and 6,470,540.

In certain embodiments, interengagement of the fastener elements provides a verification that interengagement has occurred. Verification may be detected by the senses, i.e., the fasteners making sounds as they engage; or may be detected by instrumentation or measurement. The rib shape of the slidable fastener selected to construct the bearing assemblies of the present invention will provide some means of non-destructive engagement (for instance, side insertion) and resist peel, shear, cleavage, and tensile debonding forces. A wide variety of profiles and shapes are known and are suitable for the slidable fastener.

In certain embodiments, the type of engagement/disengagement desired will determine the choice of fastener shape. For example, in applications that require controlled or partial disengagement, a series of projections, such as those described in U.S. Pat. No. 4,290,174, can provide point to point disengagement between the fastener elements. Additionally, certain fastener shapes (such as discrete projections to form the rib) will make the alignment of fastener elements for interengagement less critical than those fastener elements formed from a continuous ridge or rail. Slidable fastener ribs formed from discrete projections may also allow better conformability to irregular or multidimensional surfaces.

Figure 7:
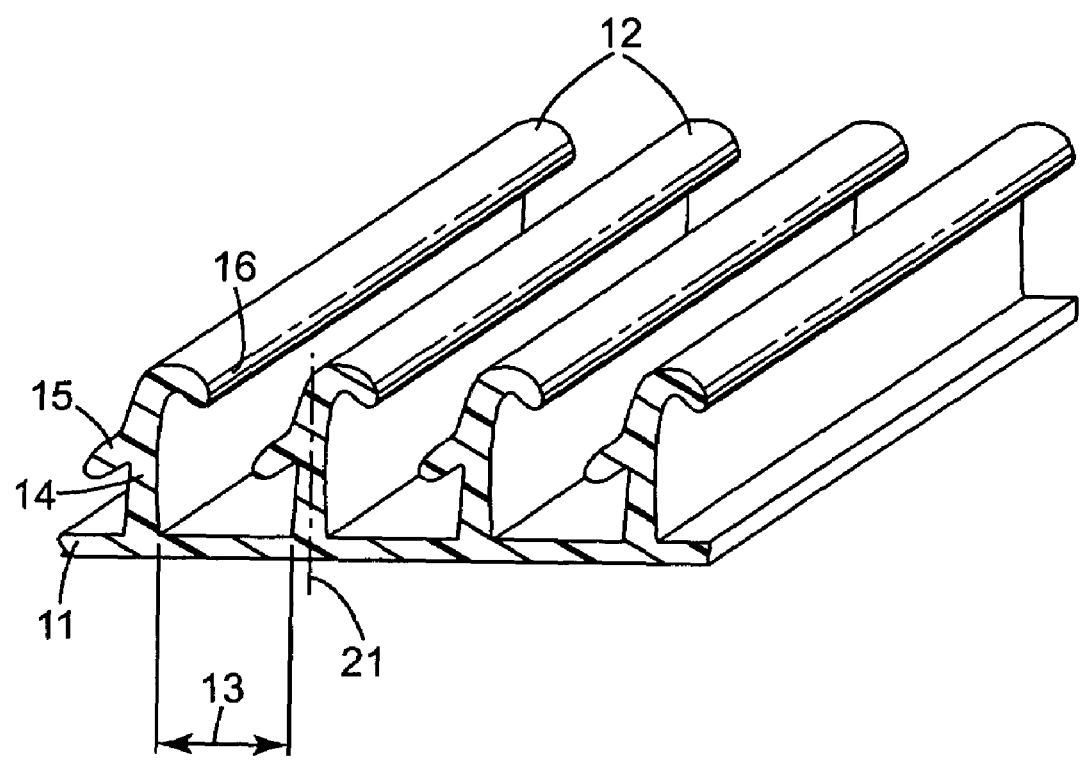
FIG. 7 shows a cross-sectional view of the fastener film used in some embodiments of the present invention.

As illustrated in FIG. 7, a representative fastener suitable for constructing the bearing assembly of the present invention comprises a base sheet 11 and a multiplicity of ribs 12 attached to and projecting upwardly from the base sheet. The ribs 12 are parallel to one another and spaced apart a transverse distance 13. Each rib comprises a stem portion 14 and flanges 15 and 16 attached to each side of the stem portion. Both flanges 15 and 16 are spaced from the base sheet 11, but the right flange 16 is attached to the top of the stem portion 14 while the left flange 15 is attached at a lower height on the stem portion ("right," "left" and "top" refer to positions in FIG. 7; "top" may also be thought of as the surface furthermost from the base sheet). Both flanges 15 and 16 extend at an angle from their point of attachment on the stem portion 14 toward the base sheet 11, with the result that at their outer or lateral edge the flanges are closer to the base sheet than are their points of attachment to the stem portion. The difference between the flanges 15 and 16 as to their height of attachment to the stem portion 14 makes the ribs 12 asymmetric about a central vertical plane 21. Such an asymmetry has been found to aid the self-mating interengagement of fasteners of the invention.

The bearing assembly can be constructed using fastener film with symmetrical ribs, e.g., ribs that have identical flanges attached to the stem portion at the same height on each side of the stem portion. Higher application of force is required to accomplish interengagement of the fasteners. Different applications will determine the selection of the appropriate mating reclosable fastener to use. In the embodiments of the present invention, the fastener film used to construct the bearing assembly is the fastener film as shown and described in U.S. Pat. No. 6,367,128, and incorporated herein by reference.

The rib used in the fastener film of the present invention is a representative coextruded rib, which in this case includes two different materials, one constituting the principal portion of the rib and the other constituting a top portion of the rib. More than two materials may be extruded and may constitute different portions of a rib or base sheet (as described, for example, in U.S. Pat. No. 6,106,922). For example, the base sheet might comprise one material, e.g., for flexibility or suppleness, and the ribs comprise a different material, e.g., a stiffer material. Or the stem portion of a rib may comprise one material, e.g., having flexibility, elasticity, or fatigue-resistant properties desired for repeated flexing, and the head portion, i.e., the top portion of the rib including the flanges, may comprise a different material, e.g., a stiffer, non-flexing material.

Fasteners used in the bearing assembly of the invention may include combinations of features such as those discussed above. When a combination of features is used, the profile formed by the ribs may have more than one regularly repeated deviation in the direction transverse to the length of the ribs from the profile that would be formed by a full population of equally spaced, identical, undivided, symmetric ribs. The asymmetries or profile-deviation features discussed above are illustrative only and are not exhaustive. Profile features may be selected from a variety of features including, as examples only, non-identity of ribs (e.g., some ribs in a regularly repeated pattern being different from other ribs in cross-sectional shape, such as different in rib height, or different in flange shape or flange dimensions), asymmetry of rib shape (e.g., at least some ribs in a regularly repeated pattern being asymmetric in shape about a central vertical plane through the rib), inequality of rib spacing (e.g., the spacing between some ribs being different in a regularly repeated pattern from the spacing between other ribs), and dividing of ribs (e.g., at least some ribs in a regularly repeated pattern having an elongated opening such as a slot or a slit.

The size of the ribs may be varied for different applications. Bearing assemblies of the invention will generally function as desired through a range of rib sizes. Depending on composition and rib shape, larger rib sizes often involve larger engagement and disengagement forces than smaller rib sizes. Larger rib sizes may be used for heavy-duty applications, where a fastener pair may be intended to stay engaged longer and/or resist greater disengagement forces; while smaller sizes may be appropriate for lighter-duty applications. Depending on rib size, ten or more ribs of a slidable fastener film are usually interengaged with ribs of the bearing in a mated fastener pair.

The fastener film typically has deformable characteristics to allow repeated closing and opening cycles with nondestructive engagement. However, the bearing assembly can be designed for single use, in which permanent deformation may occur during engagement and/or disengagement.

For many applications, the lower the force required to achieve engagement while maintaining other desired properties, the better. In contrast to the desire for a lower engagement force, it is generally desired that the disengagement force be high, i.e., higher than what was perceived as the engagement force. Disengagement forces will vary depending on the kind of support that is provided to the fastener. Thus, a fastener of the invention attached to a rigid substrate will generally experience tensile-type disengagement forces acting perpendicular to the plane of the fastener base sheet or shear or cleavage forces acting parallel to the fastener base sheet, and will experience little if any peel-type forces. On the other hand, a fastener of the invention attached to a flexible substrate will experience peel-type forces in addition to tensile and shear forces.

In other embodiments of the invention a friction-reducing agent is incorporated into a fastener film used in the invention, e.g., on the rib surfaces to enhance relative movement between the interengaged ribs of a bearing assembly. Such friction-reducing agents, for example silicone materials, also have the advantage that they help molten polymeric material flow during extrusion or other forming of the fastener body and thus assist the material to fill out the desired rib shape.

The self-closable fastener film used in the invention may be made from a variety of materials but most commonly are made from polymeric materials, using generally any polymer that can be melt processed. Homopolymers, copolymers and blends of polymers are useful, and may contain a variety of additives. Inorganic materials such as metals may also be used. The composition is chosen to provide desired bending characteristics, including usually an elastic bending movement of the stem of the rib in a direction lateral to the length of the rib and little if any bending of the flanges during engagement and disengagement. Generally a modulus of elasticity from $10^3$ MPa to $10^7$ MPa for the composition of the fastener including any additives is satisfactory but this may change depending on the application.

Suitable thermoplastic polymers include, for example, polyolefins such as polypropylene or polyethylene, polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Elastomers include, for example, natural or synthetic rubber, styrene block copolymers containing isoprene, butadiene, or ethylene (butylene) blocks, metallocene-catalyzed polyolefins, polyurethanes, and polydiorganosiloxanes. Mixtures of the polymers and/or elastomers may also be used.

Suitable additives include, for example, plasticizers, tackifiers, fillers, colorants, ultraviolet light stabilizers, antioxidants, processing aids (urethanes, silicones, fluoropolymers, etc.), low-coefficient-of-friction materials (silicones), conductive fillers to give the fastener a level of conductivity, pigments, and combinations thereof. Generally, additives can be present in amounts up to 50 percent by weight of the composition depending on the application.

Fastener film used in the bearing assembly can be formed by extruding a polymeric web through a die having an opening cut, for example, by electron discharge machining. The shape of the die is designed to generate a web with a desired cross-sectional shape or profile. The web is generally quenched after leaving the die by pulling it through a quenching material such as water. A wetting agent may be required in the quenching medium to assure good wetting of the whole surface of the extruded web, including spaces between ribs. The extruded web may be further processed, e.g., by cutting extruded ribs and stretching the web to form interruptions in the ribs or by forming structure to limit relative movement between fasteners. Fasteners are then formed, generally by cutting and slitting the extruded web. Extrusion is strongly preferred; but instead of extruding, fasteners of the invention can be prepared in other ways, for example, by injection molding or casting. Methods useful for forming the fastener elements of the present invention include those described in U.S. Pat. Nos. 5,868,987; 6,132,660; and International Publication No. WO 03/059110 A2.

EXAMPLES

These examples are merely for illustrative purposes only and are not meant to be limiting on the scope of the appended claims. All parts, percentages, ratios, etc. in the examples and the rest of the specification are by weight unless indicated otherwise.

Table of Abbreviations

| | |
|---|---|
| 9671LE | Transfer adhesive commercially available from 3M Company, St. Paul, MN |
| Self-Mating Fastener Film | Prepared as described in Example 13 of U.S. Pat. No. 6,367,128 (Galkiewicz et al.). A polypropylene resin (SRC-7644 PPco available from Union Carbide; Danbury, CT) was used along with 5% by weight of MD-50 Silicone pellets (a 50/50 silicone/polypropylene blend available from Dow Corning Corporaton; Midland, MI) with a |

-continued

Table of Abbreviations typical hook width of 711–762 micrometers and a mass per area of 363 grams/m$^2$.

Example 1

Four pieces of self-mating fastener film were cut. Two of the pieces (slidable fasteners) were cut with a length of 10 centimeters and width of 1 centimeter cut along the rib direction or machine direction of the film. The remaining 2 pieces (bearing pieces) were cut as squares with side dimensions of 1 centimeter. To the base sheet opposite the ribbed surface of one of the bearing pieces was laminated with 9671LE laminating adhesive and the base sheet of the second bearing piece was attached to this construction such that the ribs of the second bearing piece were perpendicular to the ribs of the first bearing piece to form a bearing. The bearing was engaged first with one slidable fastener and then the second slidable fastener was engaged to the bearing to form a cross with the first slider piece. The slidable fasteners of this assembly were manipulated to slide along the bearing and assume continuously variable biaxial motion, i.e., in the X-Y plane, of the two slidable fasteners relative to one another but motion orthogonal to the two planes, i.e., along the Z axis, was restricted and required disengagement of the fastener film ribs.

Example 2

Twelve pieces of self-mating fastener film were cut, as described in Example 1: 4 slidable fasteners and 8 bearing pieces. The 8 bearing pieces were laminated together to form four bearings as described in Example 1. Two of the slidable fasteners were laid parallel to each other approximately 5 centimeters apart. Two bearings were engaged to each slider piece approximately 2 centimeters from each end. The other two slidable fasteners were engaged to the bearings perpendicular to the original two slidable fasteners to form an assembly resembling a pound symbol, #, as shown in FIG. 2. The slidable fasteners of this assembly were manipulated to slide along the bearing and assume continuously variable relative motion in the X-Y plane but motion orthogonal to this plane was restricted and required disengagement of the self-mating fastener film ribs.

Example 3

As shown in FIG. 4, square polycarbonate plates with side dimensions of 7.6 centimeters and 0.5 centimeter thickness were fitted with cylindrical knobs of 2.5 centimeter diameter and 1.9 centimeter length. Square sheets of self-mating fastener film with side dimensions of 7.6 centimeters were laminated to these plates using 9671LE laminating adhesive to the side of the plate opposite the knobs. Two square bearing pieces with side dimensions of 1.9 centimeters were cut from the self-mating fastener film and laminated together to form a bearing as described in Example 1. The bearing was positioned in the middle of one plate and clicked into engagement. The other plate was positioned with ribs rotated perpendicular to the first plate and engaged onto the available outer face of the bearing. When the two knobs were grasped, the slidable fasteners of this assembly were manipulated to slide along the bearing and assume continuously variable relative motion in the X-Y plane but motion orthogonal to this plane was restricted and required disengagement of the self-mating fastener film ribs.

Example 4

The same assembly described in Example 3 was prepared only with the addition that a second bearing prepared in the same way described in Example 3 was also used. The slidable fasteners of this assembly were manipulated to slide along the bearings and assume continuously variable relative motion in the X-Y plane but motion orthogonal to this plane was restricted and required disengagement of the self-mating fastener film ribs.

Example 5

An assembly similar to that described in Example 4 with 2 slidable fasteners attached to two plates and 2 bearings was prepared only with 2 cross direction tabs. The cross direction tabs were prepared of the same self-mating fastener film as the slidable fasteners and were 2.54 centimeters square. The cross directional tabs were attached to the edges of the top and bottom slidable fasteners approximately in the center of ribs. The assembly was put together such that the bottom cross directional tab stopped the motion of the top plate when the top slidable fastener reached the tab and the top cross directional tab stopped the motion of the bottom plate when the bottom slidable fastener reached the tab.

Example 6

As shown in FIG. 5, a slidable fastener as described in Example 1 was laminated using 9671LE laminating adhesive to a cylinder with an outer diameter of 8.89 centimeters. A bearing piece as described in Example 1 was attached. The bearing of this assembly was manipulated to slide along the slidable fastener and assume continuously variable relative motion along the outer surface of the cylinder but motion orthogonal to this surface was restricted and required disengagement of the self-mating fastener film ribs.

Example 7

Similar to the embodiment shown in FIG. 6, a series of 10 slidable fasteners of 30 centimeters length and 1 centimeter width were cut in the machine or rib direction of self-mating fastener film. These strips were laminated in a parallel configuration to a stainless steel plate using strips of 9671LE laminating adhesive with a space of 1 centimeter between each strip. A series of 12 slidable fasteners of 15 centimeters length and 1 centimeter width were cut in the machine or rib direction of self-mating fastener film. These strips were laminated in a parallel configuration to a polycarbonate plate using strips of 9671LE laminating adhesive with a space of 1 centimeter between each strip. Two (2) rectangular bearing strips of 3.5 centimeters by 4.0 centimeters were cut from the self-mating fastener film. The center 5 ribs of each bearing strip were cut off with a razor blade and hole was punched in the center of each bearing strip. Two-part metal snaps were used to attach the two bearing pieces together flat side to flat side through the holes. This produced bearing pieces that were able to rotate relative to each other. The bearing ribs were engaged with the slidable fasteners laminated to the stainless steel plate and the slidable fasteners laminated to the polycarbonate plate. The slidable fasteners of this assembly were manipulated to slide along the bearing and assume continuously variable relative motion in the X-Y plane as well as rotation about the metal snap of the bearing, but motion substantially orthogonal to this plane was restricted and required disengagement of the self-mating fastener film ribs.

Example 8

The same assembly described for Example 7 was prepared only with the addition that a second bearing prepared in the same way described in Example 7 was also used. The slidable fasteners of this assembly were manipulated to slide along the bearing and assume continuously variable relative motion in the X-Y plane as well rotation about the metal snap of the bearing, but motion orthogonal to this plane was substantially restricted and required disengagement of the self-mating fastener film ribs.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be limited by the illustrative embodiments and examples set forth herein and that such examples and illustrative embodiments are presented by way of example only with the scope of the invention intended to be limited only by the claims set forth herein as follows.

What is claimed is:

1. A bearing assembly, comprising:
   a reclosable fastener film comprising a base sheet and a multiplicity of parallel ribs projecting from the base sheet to form a first slidable fastener;
   a reclosable fastener film comprising a base sheet and a multiplicity of parallel ribs projecting from the base sheet to form a first bearing piece;
   a reclosable fastener film comprising a base sheet and a multiplicity of parallel ribs projecting from the base sheet to form a second bearing piece; and
   a reclosable fastener film comprising a base sheet and a multiplicity of parallel ribs projecting from the base sheet to form a second slidable fastener;
   wherein a bearing is formed when the flat side of the base sheet opposite the ribbed surface of the first bearing piece is connected to the flat side of the base sheet opposite the ribbed surface of the second bearing piece such that the ribs of the second bearing piece are not parallel to the ribs of the first bearing piece;
   wherein the ribs of the first bearing piece are interengaged with the ribs of the first slidable fastener and the ribs of the second bearing piece are interengaged to the ribs of second slidable fastener such that the second slidable fastener is not parallel to the first slidable fastener;
   wherein the first and second slidable fasteners have substantially unrestricted biaxial motion relative to one another;
   wherein the first and second slidable fasteners have substantially restricted motion in the axial direction perpendicular to the slidable fasteners; and
   wherein at least the topmost portion of the ribs includes a friction-reducing agent to facilitate interengagement of the slidable fasteners with a bearing piece.

2. The bearing assembly of claim 1, wherein the flat side of the base sheet opposite the ribbed surface of the first bearing piece is attached to the flat side of the base sheet opposite the ribbed surface of the second bearing piece such that the ribs of the second bearing piece are perpendicular to the ribs of the first bearing piece.

3. The bearing assembly of claim 1, wherein the fastener film of the slidable fasteners and the bearing pieces are different but interengagable.

4. The bearing assembly of claim 1, wherein the fastener film of the slidable fasteners and the bearing pieces are self-mating.

5. The bearing assembly of claim 1, wherein the base sheet of at least one slidable fastener has a raised area attached to the ribs to limit the biaxial motion of the bearing.

6. The bearing assembly of claim 5, wherein the raised area comprises a reclosable fastener film comprising a base sheet and a multiplicity of parallel ribs projecting from the base sheet to form a tab.

7. The bearing assembly of claim 1, wherein the ribs of at least one slidable fastener have been permanently deformed to limit the biaxial motion of the bearing.

8. The bearing assembly of claim 1, wherein the fastener film is prepared by coextrusion of at least two different materials, whereby one portion of the fastener film comprises one material and a different portion of the fastener comprises a different material.

9. An article comprising the bearing assembly of claim 1, wherein the flat side of the base sheet opposite the ribbed surface of at least one slidable fastener is attached to a substrate.

10. The article of claim 9, wherein the base sheet is a substrate.

11. The article of claim 9, wherein the substrate is rigid.

12. The article of claim 9, wherein the substrate is flexible.

13. The article of claim 9, wherein the substrate is flat.

14. The article of claim 9, wherein the substrate is curved.

15. The article of claim 9, further comprising a second substrate attached to the second slidable fastener.

16. The bearing assembly of claim 1, wherein the bearing assembly comprises multiple slidable fasteners interengaged to multiple bearings, wherein at least one slidable fastener is not parallel to at least one other slidable fastener; and wherein at least one slidable fastener has substantially unrestricted biaxial motion relative to at least one other slidable fastener; and wherein all the slidable fasteners have substantially restricted motion in the axial direction perpendicular to the slidable fasteners.

17. The bearing assembly of claim 16, wherein the bearings further comprise rotational elements that are attached to the bearings and wherein the bearings provide rotational motion about a hypothetical axis extending though the bearings while substantially preventing motion perpendicular to the bearings.

18. The bearing assembly of claim 1, further comprising a substrate located between the first and second bearing pieces wherein the flat side of the base sheet opposite the ribbed surface of the first bearing piece is attached to the substrate, and the flat side of the base sheet opposite the ribbed surface of the second bearing piece is attached to an opposite side of the same substrate, such that the ribs of the second bearing piece are not parallel to the ribs of the first bearing piece, to form a bearing.

19. The bearing assembly of claim 1, wherein the flat side of the first and second bearing pieces are laminated to each other with an adhesive.

20. The bearing assembly of claim 1, wherein the bearing further comprises a rotational element that is attached to the bearing and wherein the bearing provides rotational motion about a hypothetical axis extending though the bearing while substantially preventing motion perpendicular to the bearing.

21. The bearing assembly of claim 1, further including a one-dimensional slidable fastener to allow z-direction motion.

22. The bearing assembly of claim 1, wherein the parallel ribs comprise a series of closely spaced projections.

23. The bearing assembly of claim 1, wherein verification occurs when the ribs of at least one of the first and second bearing piece are interengaged with at least one of the first and second slidable fastener.

24. The bearing assembly of claim 23, wherein the verification is an audible sound.

25. A bearing assembly, comprising:
a reclosable fastener film comprising a base sheet and a multiplicity of parallel ribs projecting from the base sheet to form a first slidable fastener;
a reclosable fastener film comprising a base sheet and a multiplicity of parallel ribs projecting from the base sheet to form a first bearing piece;
a reclosable fastener film comprising a base sheet and a multiplicity of parallel ribs projecting from the base sheet to form a second bearing piece; and
a reclosable fastener film comprising a base sheet and a multiplicity of parallel ribs projecting from the base sheet to form a second slidable fastener;
wherein a bearing is formed when the flat side of the base sheet opposite the ribbed surface of the first bearing piece is connected to the flat side of the base sheet opposite the ribbed surface of the second bearing piece such that the ribs of the second bearing piece are not parallel to the ribs of the first bearing piece;
wherein the ribs of the first bearing piece are interengaged with the ribs of the first slidable fastener and the ribs of the second bearing piece are interengaged to the ribs of second slidable fastener such that the second slidable fastener is not parallel to the first slidable fastener;
wherein the first and second slidable fasteners have substantially unrestricted biaxial motion relative to one another;
wherein the first and second slidable fasteners have substantially restricted motion in the axial direction perpendicular to the slidable fasteners; and
wherein the base sheet of at least one slidable fastener has a raised area attached to the ribs to limit the biaxial motion of the bearing.

26. The bearing assembly of claim 25, wherein the flat side of the base sheet opposite the ribbed surface of the first bearing piece is attached to the flat side of the base sheet opposite the ribbed surface of the second bearing piece such that the ribs of the second bearing piece are perpendicular to the ribs of the first bearing piece.

27. The bearing assembly of claim 25, wherein the raised area comprises a reclosable fastener film comprising a base sheet and a multiplicity of parallel ribs projecting from the base sheet to form a tab.

28. The bearing assembly of claim 25, wherein the ribs of at least one slidable fastener have been permanently deformed to limit the biaxial motion of the bearing.

29. An article comprising the bearing assembly of claim 25, wherein the flat side of the base sheet opposite the ribbed surface of at least one slidable fastener is attached to a substrate.

30. The article of claim 29, further comprising a second substrate attached to the second slidable fastener.

31. The bearing assembly of claim 25, wherein the bearing assembly comprises multiple slidable fasteners interengaged to multiple bearings, wherein at least one slidable fastener is not parallel to at least one other slidable fastener; and wherein at least one slidable fastener has substantially unrestricted biaxial motion relative to at least one other slidable fastener; and wherein all the slidable fasteners have substantially restricted motion in the axial direction perpendicular to the slidable fasteners.

32. The bearing assembly of claim 25, further comprising a substrate located between the first and second bearing pieces wherein the flat side of the base sheet apposite the ribbed surface of the first bearing piece is attached to the substrate, and the flat side of the base sheet opposite the ribbed surface of the second bearing piece is attached to an opposite side of the same substrate, such that the ribs of the second bearing piece are not parallel to the ribs of the first bearing piece, to form a bearing.

33. The bearing assembly of claim 25, wherein the bearing further comprises a rotational element that is attached to the bearing and wherein the bearing provides rotational motion about a hypothetical axis extending though the bearing while substantially preventing motion perpendicular to the bearing.

34. The bearing assembly of claim 25, wherein verification occurs when the ribs of at least one of the first and second bearing piece are interengaged with at least one of the first and second slidable fastener.

35. A bearing assembly, comprising:
a reclosable fastener film comprising a base sheet and a multiplicity of parallel ribs projecting from the base sheet to form a first slidable fastener;
a reclosable fastener film comprising a base sheet and a multiplicity of parallel ribs projecting from the base sheet to form a first bearing piece;
a reclosable fastener film comprising a base sheet and a multiplicity of parallel ribs projecting from the base sheet to form a second bearing piece; and
a reclosable fastener film comprising a base sheet and a multiplicity of parallel ribs projecting from the base sheet to form a second slidable fastener;
wherein a bearing is formed when the flat side of the base sheet opposite the ribbed surface of the first bearing piece is connected to the flat side of the base sheet opposite the ribbed surface of the second bearing piece such that the ribs of the second bearing piece are not parallel to the ribs of the first bearing piece;
wherein the ribs of the first bearing piece are interengaged with the ribs of the first slidable fastener and the ribs of the second bearing piece are interengaged to the ribs of second slidable fastener such that the second slidable fastener is not parallel to the first slidable fastener;
wherein the first and second slidable fasteners have substantially unrestricted biaxial motion relative to one another;
wherein the first and second slidable fasteners have substantially restricted motion in the axial direction perpendicular to the slidable fasteners; and
wherein the bearing assembly comprises multiple slidable fasteners interengaged to multiple bearings, wherein at least one slidable fastener is not parallel to at least one other slidable fastener; and wherein at least one slidable fastener has substantially unrestricted biaxial motion relative to at least one other slidable fastener;
and wherein all the slidable fasteners have substantially restricted motion in the axial direction perpendicular to the slidable fasteners.

36. The bearing assembly of claim 35, wherein the flat side of the base sheet opposite the ribbed surface of the first bearing piece is attached to the flat side of the base sheet opposite the ribbed surface of the second bearing piece such that the ribs of the second bearing piece are perpendicular to the ribs of the first bearing piece.

37. The bearing assembly of claim 35, wherein at least the topmost portion of the ribs includes a friction-reducing agent to facilitate interengagement of the slidable fasteners with a bearing piece.

38. The bearing assembly of claim 35, wherein the base sheet of at least one slidable fastener has a raised area attached to the ribs to limit the biaxial motion of the bearing.

39. The bearing assembly of claim 38, wherein the raised area comprises a reclosable fastener film comprising a base sheet and a multiplicity of parallel ribs projecting from the base sheet to form a tab.

40. The bearing assembly of claim 35, wherein the ribs of at least one slidable fastener have been permanently deformed to limit the biaxial motion of the bearing.

41. An article comprising the bearing assembly of claim 35, wherein the flat side of the base sheet opposite the ribbed surface of at least one slidable fastener is attached to a substrate.

42. The article of claim 41, farther comprising a second substrate attached to the second slidable fastener.

43. The bearing assembly of claim 35, farther comprising a substrate located between the first and second bearing pieces wherein the flat side of the base sheet opposite the ribbed surface of the first bearing piece is attached to the substrate, and the flat side of the base sheet opposite the ribbed surface of the second bearing piece is attached to an opposite side of the same substrate, such that the ribs of the second bearing piece are not parallel to the ribs of the first bearing piece, to form a bearing.

44. The bearing assembly of claim 35, wherein the bearings further comprise rotational elements that are attached to the bearings and wherein the bearings provide rotational motion about a hypothetical axis extending though the bearings while substantially preventing motion perpendicular to the bearings.

45. The bearing assembly of claim 35, further including a one-dimensional slidable fastener to allow z-direction motion.

46. The bearing assembly of claim 35, wherein verification occurs when the ribs of at least one of the first and second bearing piece are interengaged with at least one of the first and second slidable fastener.

47. A bearing assembly, comprising:
a reclosable fastener film comprising a base sheet and a multiplicity of parallel ribs projecting from die base sheet to form a first slidable fastener;
a reclosable fastener film comprising a base sheet and a multiplicity of parallel ribs projecting from the base sheet to form a first bearing piece;
a reclosable fastener film comprising a base sheet and a multiplicity of parallel ribs projecting from the base sheet to form a second bearing piece; and
a reclosable fastener film comprising a base sheet and a multiplicity of parallel ribs projecting from the base sheet to form a second slidable fastener;
wherein a bearing is formed when the flat side of the base sheet opposite the ribbed surface of the first bearing piece is connected to the flat side of the base sheet opposite the ribbed surface of the second bearing piece such that the ribs of the second bearing piece are not parallel to the ribs of the first bearing piece;

wherein the ribs of the first bearing piece are interengaged with the ribs of the first slidable fastener and the ribs of the second bearing piece are interengaged to the ribs of second slidable fastener such that the second slidable fastener is not parallel to the first slidable fastener;

wherein the first and second slidable fasteners have substantially unrestricted biaxial motion relative to one another;

wherein the first and second slidable fasteners have substantially restricted motion in the axial direction perpendicular to the slidable fasteners; and wherein the ribs of at least one slidable fastener have been permanently deformed to limit the biaxial motion of the bearing.

* * * * *

UNITED STATES PATENT AND TRADEMARK OFFICE
CERTIFICATE OF CORRECTION

PATENT NO.        : 7,140,774 B2                                         Page 1 of 1
APPLICATION NO. : 10/788597
DATED             : November 28, 2006
INVENTOR(S)       : Robert K. Galkiewicz It is certified that error appears in the above-identified patent and that said Letters Patent is hereby corrected as shown below:

Title Page,
(56) References Cited, under U.S. Patent Documents, please delete "U.S. 6,470,540 B1" and insert in place thereof -- 6,470,540 B2. --

Column 15,
Line 12, delete "apposite" and insert in place thereof --opposite--.

Column 16,
Line 25, delete "farther" and insert in place thereof --further--.
Line 27, delete "farther" and insert in place thereof --further--.
Line 51, delete "die" and insert in place thereof --the--.

Signed and Sealed this

Fourteenth Day of August, 2007

JON W. DUDAS
*Director of the United States Patent and Trademark Office*